United States Patent Office 3,223,260
Patented Dec. 14, 1965

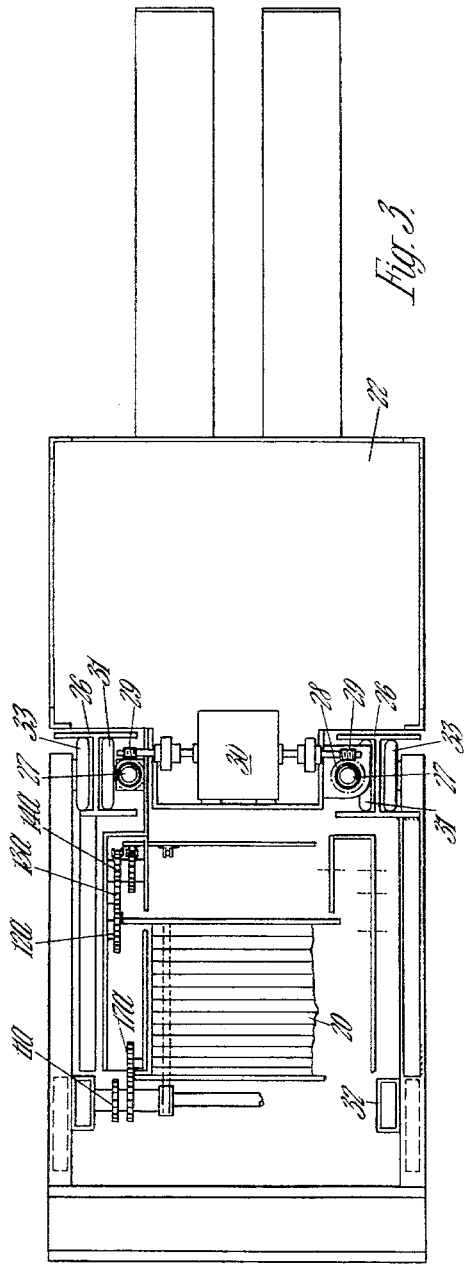

3,223,260
INDUSTRIAL TRUCKS
John Bright, Barnt Green, England, assignor to Joseph Lucas (Industries) Limited, Birmingham, England
Filed June 2, 1964, Ser. No. 371,961
Claims priority, application Great Britain, June 27, 1963, 25,575/63
8 Claims. (Cl. 214—83.1)

This invention relates to industrial trucks and has for its object to provide such a truck in a convenient form whereby articles can be fed to an overhead conveyor.

A truck according to the invention comprises a chassis, an operator's platform vertically movable on said chassis, and an elevator supported by the chassis for feeding articles to an overhead conveyor, said elevator comprising first and second endless flexible members, means supporting said members for movement in parallel paths having an upward run and a downward run, third and fourth endless flexible members, means supporting the third and fourth flexible members for movement in parallel paths having upward runs parallel to and spaced from the upward runs of the first and second members by a predetermined distance, and downward runs parallel to the downward runs of the first and second members and spaced therefrom by a distance smaller than said predetermined distance, and a plurality of flexible article supports each secured to the four members, the arrangement being such that on the upward run the supports will be substantially horizontal, but on the downward run the supports will be inclined to the horizontal.

Figure 1:
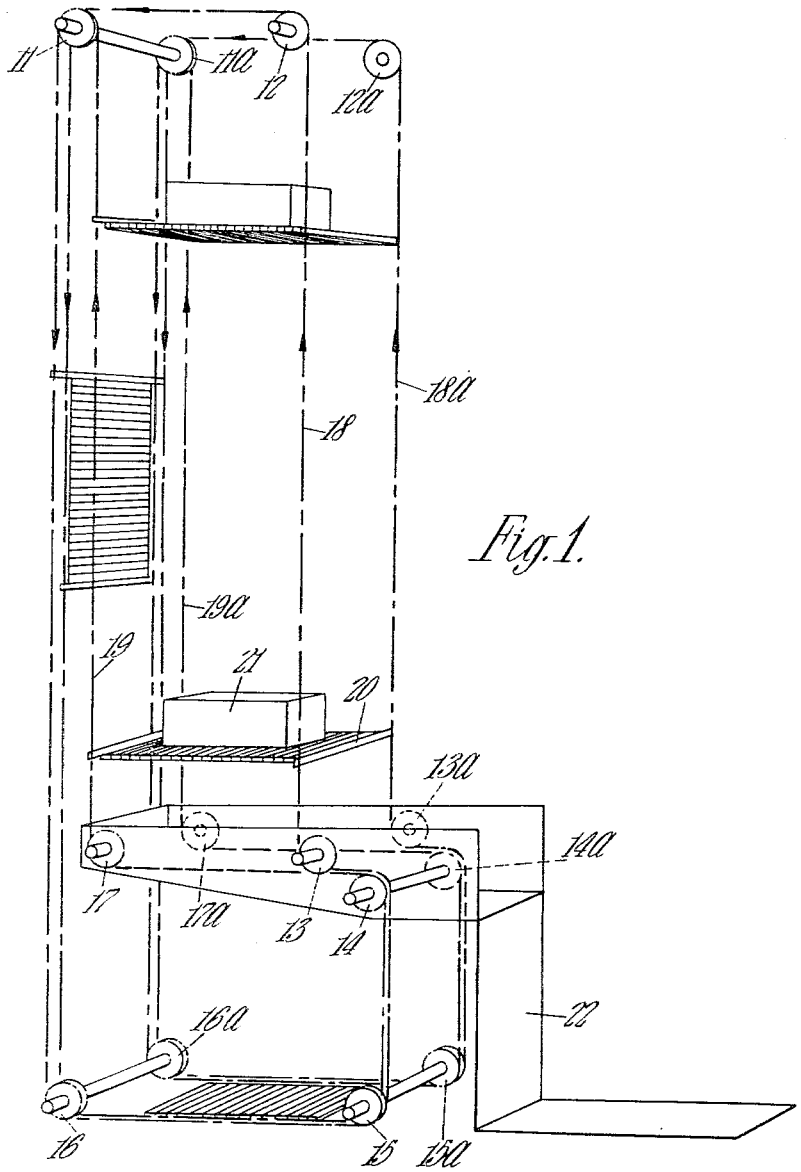
Figure 2:
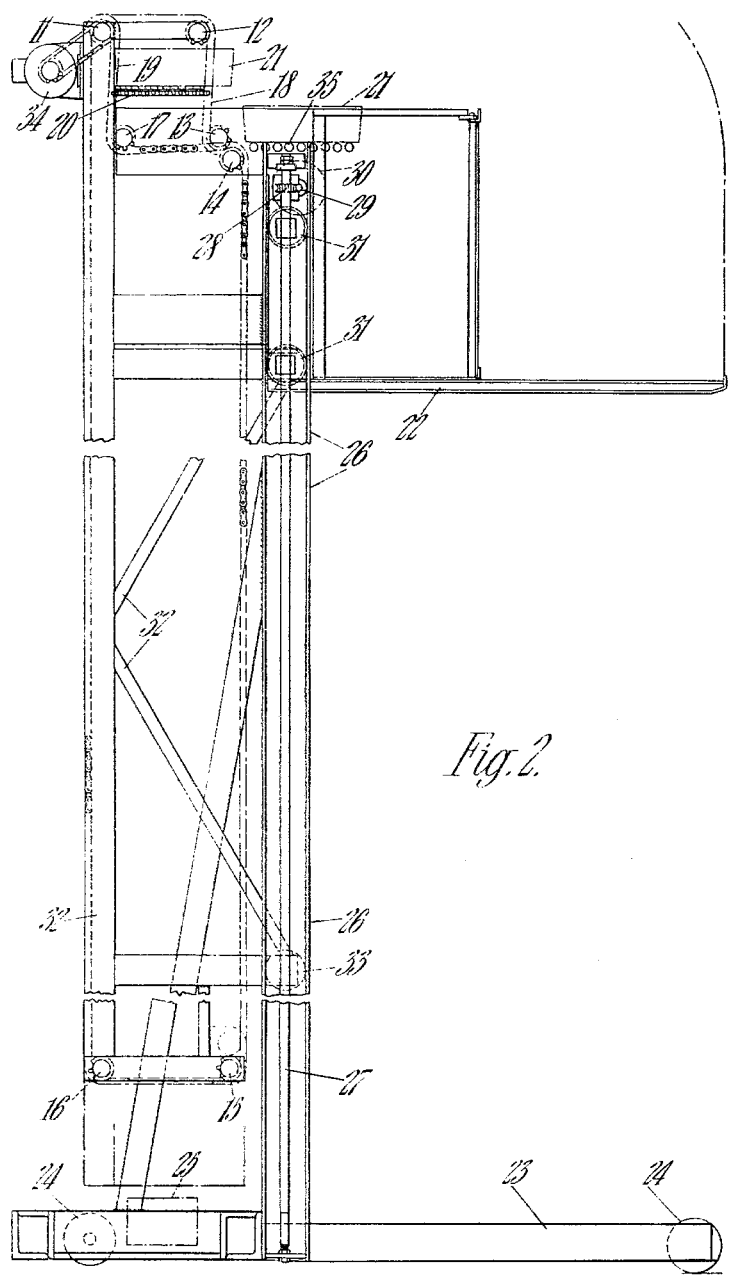

In the accompanying drawings, FIGURE 1 is a diagram illustrating one example of the invention, FIGURE 2 is a sectional side view illustrating a practical embodiment and FIGURE 3 is a plan of FIGURE 2 with parts broken away.

The truck is intended for use in warehouses where goods are stored on vertically spaced shelves and it is desired to deliver goods from these shelves to a fixed overhead conveyor positioned above the uppermost shelf. For this purpose the truck incorporates an operator's platform which is vertically movable relative to the chassis of the truck so that the operator can select goods from any shelf and place them on an elevator supported by the chassis. The elevator then automatically transports the goods to the overhead conveyor.

Referring now to FIGURE 1, the elevator comprises seven pairs of coaxial chain wheels numbered 11 to 17 and 11a to 17a, and two pairs of chains 18, 18a and 19, 19a. The chain 18 moves in an anti-clockwise direction around chain wheels 11, 16, 15, 14, 13 and 12, whilst the chain 19 moves in the same direction around chain wheels 11, 16, 15, 14 and 17. The chains 18a, 19a move in a manner similar to the chains 18, 19 respectively around the chain wheels marked with the index a.

Supported by the chains are a plurality of flexible article supports 20, each of which is secured at its four corners to the four chains. Assuming that such a support has just passed the chain wheels 11, 11a, it moves vertically downwards until it passes the chain wheels 16, 16a, after which it moves horizontally, around chain wheels 15, 15a, vertically and then around chain wheels 14, 14a. The chains 18, 18a now become separated from the chains 19, 19a as they pass the chain wheels 13, 13a and the support 20 becomes horizontal and an article 21 can be placed on it. This article will be elevated on the support 20, which will be maintained horizontal until it starts to pass one the chain wheel 11, 11a at which point an article on the support 20 will be fed onto the overhead conveyor, which is adjacent the chain wheels 11, 11a. Preferably, the entire elevator is vertically movable on the chassis of the truck to adjust the position of the upper end of the elevator relative to the overhead conveyor.

The chain wheels 13, 14, 17 and 13a, 14a, 17a are carried by the operator's platform 22, which is vertically movable on the chassis of the truck. Thus, when the platform 22 is moved vertically, the shape of the paths traversed by the chains is varied, although the overall lengths of the paths is unaltered. By this arrangement, each support 20 assumes its horizontal loading position adjacent the operator, who feeds articles onto the supports 20 as they become horizontal.

The supports 20 are preferably slotted, so that although they are normally flexible they become substantially rigid when supporting an article. This arrangement obviates any tendency to pull the chains towards each other.

Referring now to FIGURES 2 and 3, the truck includes a chassis 23 which runs on wheels 24 and is driven by a motor 25 in any convenient manner. The chassis includes a pair of I-section masts 26 having supported in their inner channels fixed screws 27. On each screw is a nut 28 secured to the platform 22, the nuts 28 being driven through worms 29 by a motor 30 carried on the platform 22 so that the platform 22 can be moved up and down. The platform 22 carries rollers 31 engaging the inner channels of the masts 26 to support the platform. As explained with reference to FIGURE 1, the chain wheels 13, 14, 17 and 13a, 14a, 17a are carried by the platform 22, and it will be noted that in FIGURE 2 the platform is shown at the limit of its upward travel.

The elevator includes structural members 32 contained within a housing and carrying rollers 33 engaging the outer channels of the masts 26 to support the elevator. Any convenient means (not shown) is provided for moving the elevator vertically on the masts. The elevator chains are driven by a motor 34 carried by the elevator in driving engagement with the chain wheel 11.

Preferably, the platform 22 incorporates rollers 35 on which an operator can place an article 21. The arrangement is such that if an article is placed on the rollers 35 with its edge overlapping the roller nearest the chains, the article will automatically be engaged by the next support 20 and fed to the overhead conveyor.

Having thus described my invention what I claim as new and desire to secure by Letters Patent is:

1. An industrial truck comprising a chassis, an operator's platform vertically movable on the chassis, and an elevator supported by the chassis for feeding articles to an overhead conveyor, said elevator comprising first and second endless flexible members, means supporting said members for movement in parallel paths having an upward run and a downward run, third and fourth endless flexible members, means supporting the third and fourth flexible members for movement in parallel paths having upward runs parallel to and spaced from the upward runs of the first and second members by a predetermined distance, and downward runs parallel to the downward runs of the first and second members and spaced therefrom by a distance smaller than said predetermined distance, and a plurality of flexible article supports each secured to the four members, the arrangement being such that on the upward run the supports will be substantially horizontal, but on the downward run the supports will be inclined to the horizontal.

2. An industrial truck as claimed in claim 1 in which the elevator includes parts movable vertically with said platform and around which the flexible members move so that although the lengths of the flexible members are fixed, the position at which the supports become horizontal at the commencement of said upward run varies with, and is adjacent to, the operator's platform.

3. An industrial truck as claimed in claim 2 including rollers on the operator's platform for supporting articles to be removed by a flexible support as the flexible support becomes horizontal.

4. An industrial truck comprising in combination a chassis, an operator's platform vertically movable on said chassis, an elevator for feeding articles to an overhead conveyor, and means supporting said elevator for vertical movement relative to said chassis, said elevator comprising first and second endless flexible members, means supporting said members for movement in parallel paths having an upward run and a downward run, third and fourth endless flexible members, means supporting the third and fourth flexible members for movement in parallel paths having upward runs parallel to and spaced from the upward runs of the first and second members by a predetermined distance, and downward runs parallel to the downward runs of the first and second members and spaced therefrom by a distance smaller than said predetermined distance, and a flexible article support secured to the four members, the arrangement being such that on the upward run said support will be substantially horizontal, but on the downward run said support will be inclined to the horizontal, and said elevator including parts movable vertically with said platform and around which the flexible members move, so that although the lengths of the flexible members are fixed, the position at which the supports become horizontal at the commencement of said upward run varies with, and is adjacent to, the operator's platform.

5. An industrial truck as claimed in claim 4 in which the operator's platform is vertically movable on a pair of masts forming part of the chassis of the truck, and said elevator is also vertically movable on said masts.

6. An industrial truck comprising in combination a chassis, an operator's platform vertically movable on the chassis, and an elevator supported by the chassis for feeding articles to an overhead conveyor, said elevator comprising first and second endless flexible members, means supporting said members for movement in parallel paths having an upward run and a downward run, third and fourth endless flexible members, means supporting the third and fourth flexible members for movement in parallel paths having upward runs parallel to and spaced from the upward runs of the first and second members by a predetermined distance, and downward runs parallel to the downward runs of the first and second members and spaced therefrom by a distance smaller than said predetermined distance, and a slatted article support secured to said four members, the arrangement being such that on the upward run said support will be substantially horizontal and rigid, but on the downward run said support will be inclined to the horizontal and flexible, said elevator further including parts movable vertically with said platform and around which the flexible members move so that although the length of the flexible members are fixed, the position at which the support becomes horizontal at the commencement of said upward run varies with, and is adjacent to, the operator's platform.

7. An industrial truck comprising in combination a chassis, an operator's platform vertically movable on said chassis, and an elevator supported by the chassis for conveying articles placed thereon to an overhead conveyor, the elevator including a flexible support which is moved in a path including an upward run in which the support is substantially horizontal and capable of receiving an article, and a downward run in which the support is substantially vertical so that as the support moves from its substantially horizontal position to its substantially vertical position an article thereon will be fed to an adjacent overhead conveyor, the operator's platform carrying parts which determine the position at which the support becomes horizontal at the commencement of said upward run, so that said position is movable with, and adjacent to, the operator's platform.

8. An industrial truck comprising in combination a chassis, an operator's platform vertically movable on said chassis, and an elevator supported by the chassis for conveying articles placed thereon to an overhead conveyor, the elevator including a plurality of flexible supports which are moved in a path including an upward run in which the supports are substantially horizontal and capable of receiving an article, and a downward run in which the supports are substantially vertical so that as a support moves from its substantially horizontal position to its substantially vertical position an article thereon will be fed to an adjacent overhead conveyor, the operator's platform carrying parts which determine the position at which the supports become horizontal at the commencement of said upward run, so that said position is movable with, and adjacent to, the operator's platform.

References Cited by the Examiner

UNITED STATES PATENTS

| 2,708,998 | 5/1955 | Ulinski | 214—83.1 X |
| 3,024,891 | 3/1962 | Sawrie | 198—154 |

HUGO O. SCHULZ, *Primary Examiner.*

GERALD M. FORLENZA, *Examiner.*